United States Patent
Scherer (10) Patent No.: US 11,557,078 B1
(45) Date of Patent: Jan. 17, 2023

(54) MACHINE LEARNING SIMULATION OF FINITE ELEMENT ANALYSIS IN AUGMENTED REALITY

(71) Applicant: Honeywell Federal Manufacturing & Technologies, LLC, Kansas City, MO (US)

(72) Inventor: Derek Carl Scherer, Overland Park, KS (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 17/667,258

(22) Filed: Feb. 8, 2022

(51) Int. Cl.
*G06F 30/23* (2020.01)
*G06T 15/04* (2011.01)
*G06T 19/00* (2011.01)
*G06F 30/27* (2020.01)
*G06F 3/01* (2006.01)

(52) U.S. Cl.
CPC .............. *G06T 15/04* (2013.01); *G06F 3/014* (2013.01); *G06F 3/016* (2013.01); *G06F 30/23* (2020.01); *G06F 30/27* (2020.01); *G06T 19/006* (2013.01)

(58) Field of Classification Search
CPC ....... G06T 15/04; G06T 19/006; G06F 30/23; G06F 30/27; G06F 3/014; G06F 3/016
See application file for complete search history.

(56) References Cited

U.S. PATENT DOCUMENTS

| 10,769,325 | B2 | 9/2020 | Van der Velden et al. |
| 11,475,184 | B1* | 10/2022 | Mlika ...................... G06F 30/12 |
| 2017/0372480 | A1* | 12/2017 | Anand ...................... G06T 7/11 |
| 2019/0325112 | A1* | 10/2019 | Vernon ................... G06T 17/20 |
| 2021/0247737 | A1* | 8/2021 | Shen ..................... G05B 19/404 |
| 2022/0080545 | A1* | 3/2022 | Sanders ................. G06N 5/025 |
| 2022/0164942 | A1* | 5/2022 | Dev ....................... G06T 5/002 |
| 2022/0244029 | A1* | 8/2022 | Adriano ........... G05B 19/41885 |

FOREIGN PATENT DOCUMENTS

WO 2018156087 A1 8/2018

OTHER PUBLICATIONS

Holden, D. et al.; Subspace Neural Physics: Fast Data-Driven Interactive Simulation; SCA; Jul. 26-28, 2019; pp. 1-12; Los Angeles, CA, USA.

(Continued)

*Primary Examiner* — Dennis P Joseph
(74) *Attorney, Agent, or Firm* — Erise IP, P.A.

(57) ABSTRACT

Media, method and system for approximating a finite element analysis texture map for an object. To accomplish this, the object is converted to a computer generated model and finite element analysis is performed for a plurality of different simulated inputs to generate a plurality of simulated mappings. Each simulated mapping is converted into a simulated texture map. A machine learning model is trained on the simulated inputs and simulated texture maps to generate a texture map which approximates a finite element analysis. The machine learning model receives a user input and generates the texture map therefrom. The texture map is then wrapped to the object and displayed.

20 Claims, 4 Drawing Sheets

(56) References Cited

OTHER PUBLICATIONS

Gondipalle, S.; Physics Informed Machine Learning (PIML): Surrogate models providing Deeper Insights with Less Data; Linkedin; pp. 1-4; Nov. 5, 2019.
Erkek, M. et al; Augmented Reality Visualization of Modal Analysis Using the Finite Element Method; Applied Sciences; Feb. 1, 2021; pp. 1-11; vol. 11 Issue 1310.
Accelerating Eulerian Fluid Simulation with Convolutional Networks; available at: https://www.youtube.com/watch?v=w71zxkniJfo; accessed on: Feb. 16, 2021.

* cited by examiner

MACHINE LEARNING SIMULATION OF FINITE ELEMENT ANALYSIS IN AUGMENTED REALITY

STATEMENT OF GOVERNMENTAL SUPPORT

This invention was made with governmental support under DE-NA-0002839 awarded by the United States Department of Energy/National Nuclear Security Administration. The government has certain rights in the invention.

BACKGROUND

1. Field

Embodiments of the invention generally relate to using a trained machine learning model. More specifically, embodiments of the invention related to using a trained machine learning model to simulate a finite element analysis texture map on an object in augmented reality.

2. Related Art

Finite element analysis (FEA) breaks complex problems into smaller pieces so that they can be solved computationally. Each of these smaller pieces has a simple relationship to the other pieces around it that can be modeled mathematically. These smaller, simple pieces are then re-assembled as matrix equations. FEA can be used to solve boundary value problems, which are mathematical problems in which the quantity of interest is defined by a differential equation throughout a region wherein initial values are only known in specific areas, i.e., the region's boundaries. Common boundary value problems in engineering include stress analysis, heat transfer, fluid flow, and electric or magnetic potential.

FEA software exists to perform FEA on three-dimensional computer models of objects. Typical FEA software simulates how each smaller piece of the object would function in correlation with the other smaller pieces in response to an input. The end result of FEA is a mapping showing how each finite element would respond, which as a whole shows how the entire object would respond to the given input. The results of the FEA may be graphically displayed to a user to show how the object would respond, often showing the object that each smaller piece corresponds to as colored to specify how each piece would respond. However, such software is slow and takes considerable computing power and processing time. Additionally, the software often requires excessive manipulation of variables to determine an optimal analysis. As such, FEA software is not useful on its own for rapid prototyping or for dynamically displaying the results as the inputs change in real time. Thus, there is a need for a tool that can provide a more accurate simulation in real time.

SUMMARY

Embodiments of the invention address the above-described need by providing methods, media, and systems for using a machine learning model to simulate a FEA texture map on an object in real time and displaying the results. A series of FEA may be run on the object for a variety of different simulated inputs to produce a set of simulated FEA mappings, which show how the simulated inputs affect the object. These simulated FEA mappings are then converted to simulated texture maps, which when wrapped around the objects, show the results of the simulated FEA mappings as they affect the surface of the object. A machine learning model trains on these simulated inputs and simulated texture maps to be able to generate a texture map from an input. An input can then be used with the machine learning model to produce a texture map for the object, which can then be wrapped around the object and displayed.

Embodiments of the present invention provide a machine learning model that allows for real time feedback for rapid prototyping. A user can immediately see how different inputs, such as forces applied to an object, might impact the internal stresses in the object. By training a machine learning model to simulate a FEA texture mapping, the benefits of FEA may be approximated efficiently without requiring considerable computing power. Such models may run on devices with lower power and processing requirements, making them an ideal fit for applications such as augmented and virtual reality head mounted displays. In combination with gloves which may sense a user's hand movement and force, a user may interact with an object and immediately see the impact that different inputs would have on the object.

In some aspects, the techniques described herein relate to one or more non-transitory computer-readable media storing computer-executable instructions that, when executed by a processor, perform a method of approximating a finite element analysis texture map for an object, the method including the steps of: receiving a three-dimensional virtual model of the object; running a plurality of finite element analysis simulations on the three-dimensional virtual model, wherein each finite element analysis simulation includes generating a simulated strain mapping based on one or more simulated inputs; generating a simulated texture map for each simulated strain mapping; training a supervised learning model to generate a predicted texture map, wherein the supervised learning model is trained on the one or more simulated inputs and simulated texture maps; receiving one or more user inputs corresponding to the object; generating the predicted texture map for the object based on the one or more user inputs using the supervised learning model; and displaying the predicted texture map as applied to the object.

In some aspects, the techniques described herein relate to a computer-readable media, wherein the one or more user inputs corresponding to the object are generated by measuring forces applied to the object.

In some aspects, the techniques described herein relate to a computer-readable media, wherein a numeric indication of the one or more user inputs is also displayed.

In some aspects, the techniques described herein relate to a computer-readable media, wherein the predicted texture map as applied to the object is displayed on a head mounted display.

In some aspects, the techniques described herein relate to a computer-readable media, wherein the predicted texture map as applied to the object is displayed in augmented reality.

In some aspects, the techniques described herein relate to a computer-readable media, wherein the three-dimensional virtual model of the object includes information about at least one material of the object.

In some aspects, the techniques described herein relate to a computer-readable media, wherein the predicted texture map includes a colored indication of internal strains in the object.

In some aspects, the techniques described herein relate to a system for approximating a finite element analysis texture map for an object, including: a server programmed to: run a plurality of finite element analysis simulations on a three-dimensional computer model of the object, wherein each finite element analysis simulation includes generating a simulated strain mapping based on one or more simulated inputs; convert each simulated strain mapping to a simulated texture map; and train a supervised learning model to generate a predicted texture map that approximates the finite element analysis simulation based on one or more user inputs, wherein the supervised learning model is trained on the one or more simulated inputs and simulated texture maps; at least one sensor programmed to measure the one or more user inputs related to the object; and a head mounted display programmed to: receive the predicted texture map based on the supervised learning model; and apply the predicted texture map to the object.

In some aspects, the techniques described herein relate to a system, wherein the at least one sensor is attached to a glove and measures a force applied by the glove to the object and a position of the sensor.

In some aspects, the techniques described herein relate to a system, wherein the at least one sensor includes a first sensor attached to a first finger portion of the glove and a second sensor attached to a second finger portion of the glove.

In some aspects, the techniques described herein relate to a system, wherein the head mounted display includes a camera, and wherein the predicted texture map is applied to the object and displayed in an augmented reality environment.

In some aspects, the techniques described herein relate to a system, wherein the head mounted display includes a virtual reality headset, the object is a virtual object, and the predicted texture map is applied to the object and displayed in a virtual reality environment.

In some aspects, the techniques described herein relate to a system, wherein the at least one sensor is attached to a glove to provide haptic feedback to a user.

In some aspects, the techniques described herein relate to a system, wherein the haptic feedback is configured to restrict a movement of one or more fingers of the user in connection with the user interacting with the object in virtual reality.

In some aspects, the techniques described herein relate to a method of approximating a finite element analysis texture map for an object, the method including: receiving a three-dimensional virtual model of the object; running a plurality of finite element analysis simulations on the three-dimensional virtual model, wherein each finite element analysis simulation includes generating a simulated strain mapping based on one or more simulated inputs; generating a simulated texture map for each simulated strain mapping; training a supervised learning model to generate a predicted texture map, wherein the supervised learning model is trained on the one or more simulated inputs and simulated texture maps; receiving one or more user inputs corresponding to the object; generating the predicted texture map for the object based on the one or more user inputs using the supervised learning model; and displaying the predicted texture map as applied to the object.

In some aspects, the techniques described herein relate to a method, further including: measuring forces applied to the object to generate the one or more user inputs corresponding to the object.

In some aspects, the techniques described herein relate to a method, further including: displaying a numeric indication of the one or more user inputs.

In some aspects, the techniques described herein relate to a method, further including: displaying the predicted texture map as applied to the object on a head mounted display.

In some aspects, the techniques described herein relate to a method, further including: displaying the predicted texture map as applied to the object in augmented reality.

In some aspects, the techniques described herein relate to a method, wherein the three-dimensional virtual model of the object includes information about at least one material of the object.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments generate a simulated finite element analysis texture map for an object using a machine learning model trained on finite element analysis inputs and outputs corresponding to the object. A user provides inputs to the trained machine learning model by, for example, manipulating the object. The machine learning model takes these inputs and generates the texture map. This texture map can then be wrapped to the object in real time and displayed back to the user. As the user continues to manipulate the object and apply new forces, the machine learning model can generate an updated texture map, providing the user with real time feedback. In some embodiments, the generated texture map is wrapped over the object in an augmented reality environment. More generally, embodiments as described above can be combined with the other concepts disclosed herein to form an integrated and efficient system for providing a simulation of finite element analysis texture maps to an object in real time to a user.

Although embodiments are generally depicted as showing the inputs as force vectors to model stress analysis, embodiments which analyze heat transfer, fluid flow, and electric or magnetic potential are also contemplated. For example, sensors may additionally or alternatively measure sources of liquid, heat, electricity, or magnetism. In some embodiments, these sources may be simulated. A user may interact with these sources to produce new inputs, and a machine learning model may be trained to map how these changes affect an object. Then, this mapping can be applied to an object in augmented reality to, for example, show how different locations and intensities of a heating element may affect heat transfer within an object.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment," or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Figure 1:
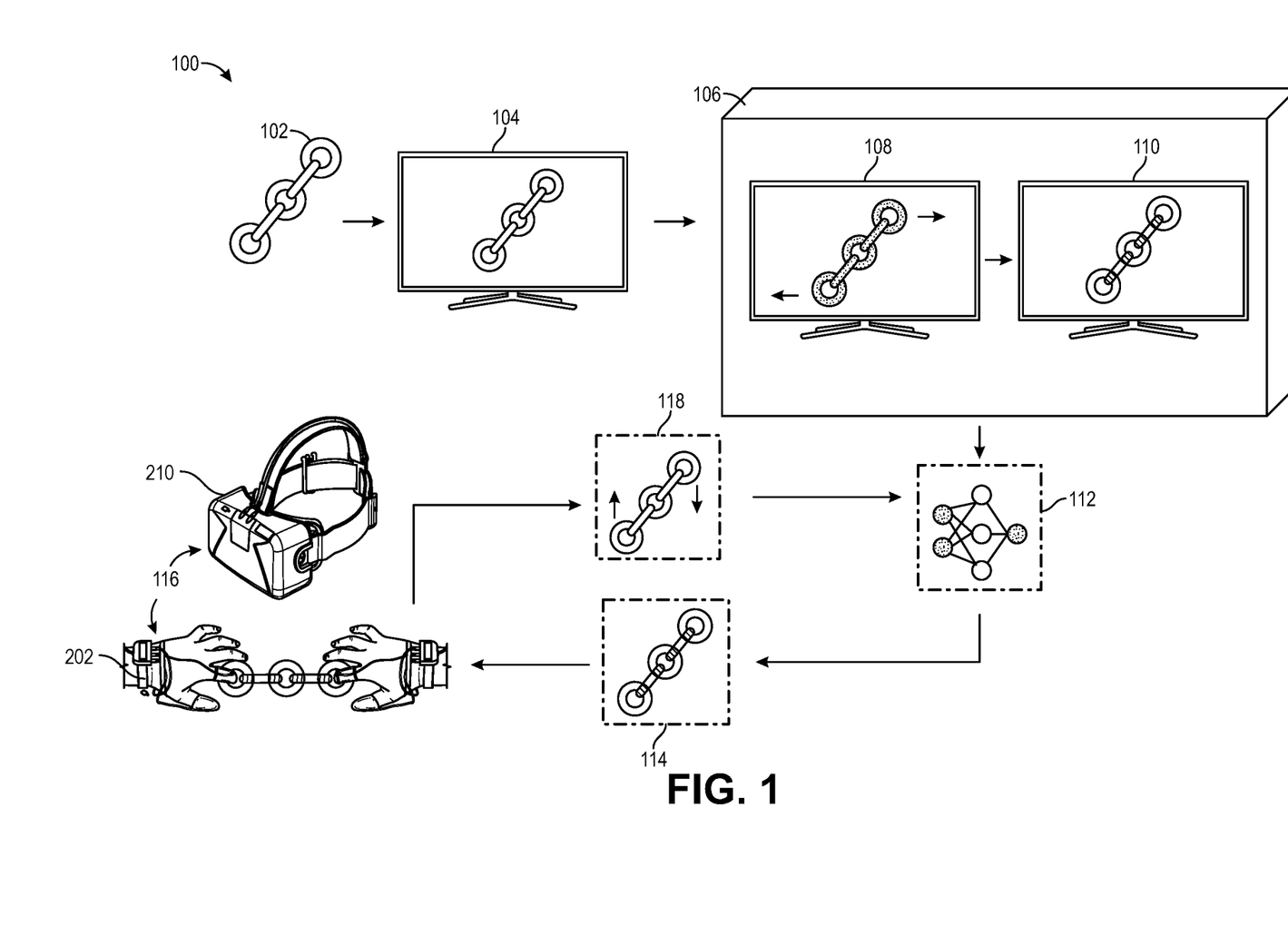
FIG. 1 depicts an exemplary embodiment of the system for approximating a finite element analysis texture map for an object.

FIG. 1 illustrates an exemplary embodiment and is referred to generally by reference numeral 100. Object 102 may be selected for processing. In some embodiments, object 102 may be any tangible and physical object. In further embodiments, object 102 may be made of metal, wood, plastic, or any other physical material. In still further embodiments, object 102 may be made of multiple different materials. In even still further embodiments, object 102 may be made up of multiple smaller parts. For example, object 102 may be a plurality of metal chains combined together to form a chain link. In other embodiments, object 102 may be a virtual object existing in virtual reality.

To perform finite element analysis on object 102, object 102 must be converted into digital representation object 104. In some embodiments, the process of converting object 102 into digital representation object 104 occurs within FEA software 108. In further embodiments, separate software may be used to generate the three dimensional model used as digital representation object 104. In still further embodiments, object 102 may be scanned to create digital representation object 104. In some embodiments, digital representation object 104 shares the same structure and material as object 102. In further embodiments, digital representation object 104 includes additional information regarding the material composition of object 102.

The finite element analysis mappings are generated at step 106. First, digital representation object 104 is input into FEA software 108. The FEA software 108 breaks down digital representation object 104 into a finite number of smaller pieces, enabling FEA software 108 to run its analysis. A simulated input is then provided to FEA software 108. Using the simulated input, which for example may be a specific force location and direction acting on digital representation object 104 within FEA software 108, simulated output mapping 110 is produced. Simulated output mapping 110 is then converted to a simulated texture map. In some embodiments, simulated output mapping 110 shows how the simulated input would affect object 102. For example, simulated output mapping 110 may be a color-coded overlay showing the various stresses on object 102 in which red may represent a high internal stress and blue may represent a low internal stress. Step 106 creates a mapping of a simulated input to simulated output mapping 110. In some embodiments, step 106 is repeated until sufficient simulation data is obtained.

Machine learning model 112 is trained on the simulated inputs and simulated texture maps. In some embodiments, machine learning model 112 is a supervised learning model. In further embodiments, machine learning model 112 is a neural network. Machine learning model 112 is trained such that machine learning model 112 will take an input and generate a texture map that approximates a finite element analysis for object 102 based on that input.

Once machine learning model 112 is trained, it is ready to be used to approximate FEA in real time. In some embodiments, machine learning model 112 may be transferred to and stored within a memory on a headset. In other embodiments, machine learning model 112 may be stored on a server. In some embodiments, machine learning model 112 may generate an initial texture map 114 for object 102 based on no inputs. In further embodiments, machine learning model 112 may receive initial inputs 118 before generating texture map 114. In some embodiments, once texture map 114 is generated it will be wrapped around object 102 in augmented reality. For example, a user looking through head mounted display 210 within head mounted display and glove system 116 may perceive object 102 as if its surface was covered in texture map 114. In some embodiments, head mounted display 210 may be a virtual reality or augmented reality headset. In further embodiments, head mounted display 210 may also display a numeric indication of the inputs.

The gloves 202 within a head mounted display and glove system 116 may contain sensors, such as one or more accelerometers, gyroscopes, magnetometers, load cells, strain gages, and/or force sensing resistors to measure inputs 118 on object 102. Inputs 118 may be used as inputs into machine learning model 112 to generate an updated texture map 114. This process of updating texture map 114 based on new inputs 118 and displaying the texture map to a user may be repeated as necessary. In some embodiments, the process of updating texture map 114 is continuous.

Figure 2:
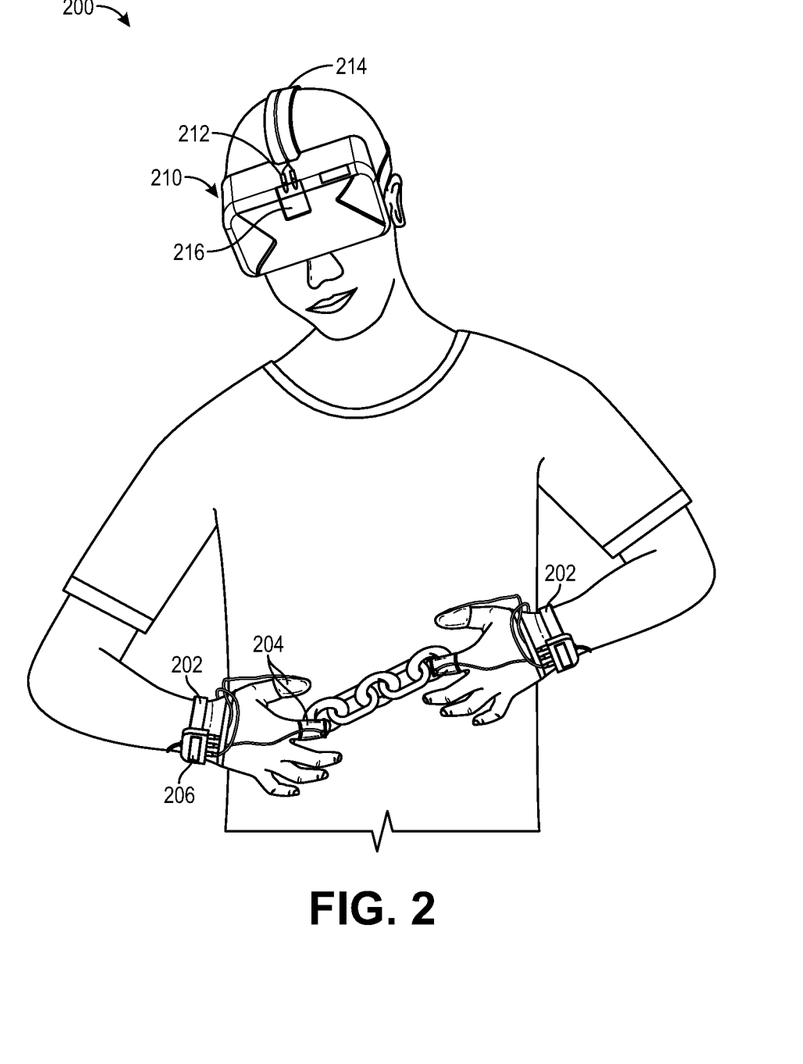
FIG. 2 depicts an exemplary hardware platform for certain embodiments.

Turning now to FIG. 2, an exemplary hardware platform for certain embodiments is depicted, and referred to generally by reference numeral 200. In some embodiments, a user of hardware platform 200 may utilize gloves 202 and head mounted display 210. In further embodiments, a user may use only one glove 202. In some embodiments, gloves 202 may cover the full hand of a user or cover only a portion thereof. In some embodiments, gloves 202 may include finger portions covering some or all fingers or portions thereof. In still further embodiments, gloves 202 and head mounted display 210 may be connected via wires or wirelessly. For example, gloves 202 may be connected to head mounted display 210 via a wireless connection such as Wi-Fi or Bluetooth, or through a wired connection such as USB or ethernet. In some embodiments, gloves 202 may be connected to head mounted display 210 via a server, the internet, or another network.

In some embodiments, gloves 202 may contain or be attached or connected to one or more sensors 204. In some embodiments, The sensors 204 may be connected to one or more fingertips of gloves 202. Gloves 202 may contain processing connector 206 that connects sensors 204 to the head mounted display 210. In further embodiments, head mounted display 210 may be equipped with one or more sensors. In some embodiments, sensors may be separate from both gloves 202 and head mounted display 210 and communicate information directly to the hardware platform.

In some embodiments, one or more sensors 204 may measure force inputs and/or the current position of sensors 204. In further embodiments, gloves 202 may provide force feedback to the user. For example, gloves 202 may include haptic feedback and restrict the movement of the user's fingers to coincide with the user touching an object in virtual reality. This allows the virtual reality experience to simulate to the user as if the user is physically interacting with an object. Such haptic feedback may be achieved such as by motors in gloves 202 which are programmatically controlled in coordination with head mounted display 210. In further embodiments, gloves 202 may vibrate to signify when the user performs a specific action on an object.

In some embodiments, head mounted display 210 may be a commercially available augmented reality or virtual reality headset. For example, head mounted display 210 may be an OCULUS RIFT, OCULUS QUEST, HTC VIVE, VUZIX SMART GLASSES, or SONY PLAYSTATION VR, or similar headsets, although any headset which provides the user with an augmented reality or virtual reality experience is contemplated. Head mounted display 210 may be in the form of goggles, or glasses, or any other form that provides a display to a user near a user's eyes. In some embodiments, head mounted display 210 includes elements for displaying images and or videos to the user via one or more screens located in head mounted display 210. In other embodiments, head mounted display 210 may include glass which the user can see through, which may then have an overlay projected onto the glass. In some embodiments, head mounted display 210 may include ports 212 which permit head mounted display 210 to connect with external devices, such as gloves 202. In further embodiments, head mounted display 210 may include straps 214 to secure head mounted display 210 on the user's head.

In some embodiments, head mounted display 210 may include camera 216. Camera 216 may sense and record where the user is currently looking and allow the user to see in augmented reality. In some embodiments, camera 216 may include additional processing software which can track the location of objects, including the primary object 102. In further embodiments, the object tracking may be used to assist with wrapping the texture map from the machine learning model 112 to the primary object 102 for display to the user.

Figure 3:
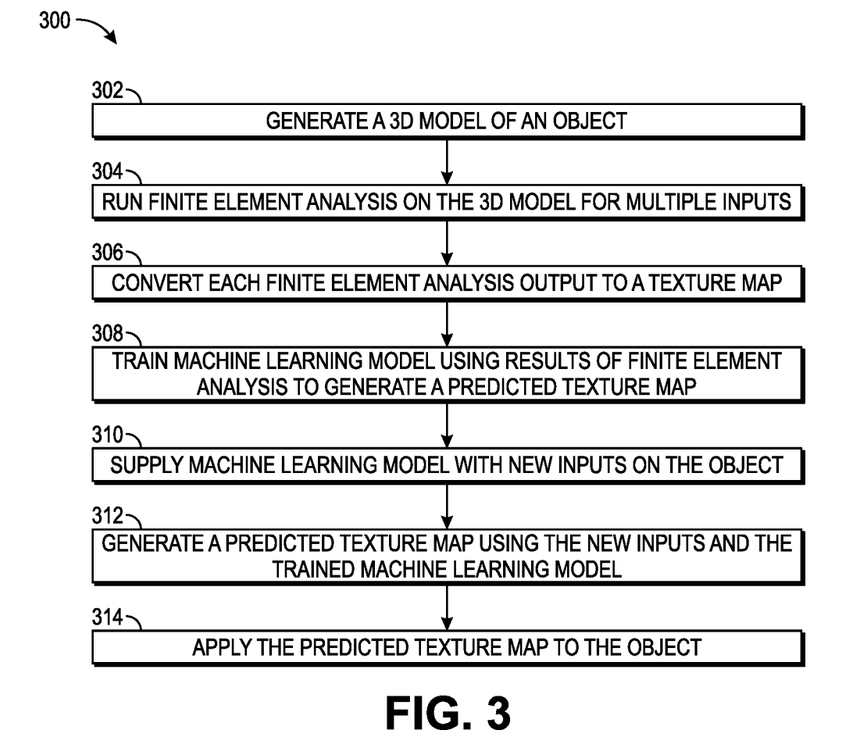
FIG. 3 depicts an exemplary flow chart for illustrating the operation of a method in accordance with one embodiment.

Turning now to FIG. 3, an exemplary flow chart is depicted illustrating the operation of a method 300 for generating an approximate FEA mapping and applying it to an object 102. At step 302, a three-dimensional model is generated for object 102. In some embodiments, the three-dimensional model may be generated based on scanning object 102 in three dimensions. For example, pictures of object 102 from multiple angles may be used to generate the three-dimensional model. As another example, laser scanners can be used to generate precise re-creations of object 102. In further embodiments, a contact scanner may probe object 102 to measure its dimensions and generate a three-dimensional model. In still further embodiments, the model may be created using three-dimensional modeling software to construct the model based on object 102.

At step 304, FEA is repeatedly performed on the three-dimensional model for a plurality of inputs to generate a plurality of mappings. In some embodiments, the finite element analysis is run using FEA software. The FEA software may be for example, ANSYS, SIMSCALE, COMSOL MULTIPHYSIS, OPENFOAM, ABAQUS, ALTAIR HYPERWORKS, AUTODESK CFD, IVRESS, NASTRAN, SAMCEF, and/or LS-DYNA, or other similar software. Although specific examples are disclosed, any type of software which performs FEA is contemplated. In some embodiments, the inputs may be randomized. In other embodiments, the inputs may be predetermined to cover a wide variety of different inputs. For each input, the FEA produces a mapping. In some embodiments, the FEA may be performed as if the three-dimensional model is composed of different materials to generate multiple sets of mappings corresponding to the different materials.

At step 306, each of the mappings generated from the FEA is converted into a simulated texture map, which may be stored as a texture file. In some embodiments, edge detection may be used to determine the surface area of the mapping. The surface of the mapping may then be converted into a two-dimensional texture map. For example, the texture map may indicate via a colored indication of how the surface of object 102 would respond for a given input. In still further embodiments, the texture file may include instructions as to how the texture file should be used to wrap around object 102.

At step 308, a machine learning model 112 is trained on the plurality of inputs and the plurality of simulated texture maps. The machine learning model 112 is trained such that it can receive a new input and generate a predicted texture map based on the new input. In some embodiments, step 306 may be repeated if it is determined that the machine learning model does not have adequate training data to generate a sufficient predicated texture map. In further embodiments, multiple machine learning models may be trained wherein each machine learning model 112 is trained on data corresponding to object 102 being composed of a different material.

At step 310, the machine learning model 112 is supplied with new inputs on object 102. In some embodiments, the new inputs may be computer generated. In further embodiments, the new inputs may come from one or more sensors. For example, the new input may be a force applied by a user to object 102. In some embodiments, the new input may correspond to a force vector, a location, a temperature, an electrical current, and/or a flow of liquid. In further embodiments, the new inputs may be applied to a virtual version of object 102. In some embodiments, the new inputs may be entered by the user directly. For example, a user may input a specific temperature using voice controls, mouse and keyboard, or any other data entry method.

At step 312, the machine learning model 112 generates a predicted texture map 114 based on the new inputs. In some embodiments, the predicted texture map 114 may be colored to indicate the impact of the input on different portions of object 102. For example, if the input corresponds to a user bending object 102, predicted texture map 114 may indicate which points of object 102 are under the most stress with the color red and indicate low stress areas of object 102 with the color blue. In some embodiments, predicted texture map 114 may also include metadata to indicate how predicted texture map 114 should be applied to object 102.

At step 314, predicted texture map 114 is applied to object 102. In some embodiments, applying predicted texture map 114 to object 102 involves displaying object 102 as if it was wrapped by predicted texture map 114. For example, the surface area of object 102 should appear to have the texture and/or colors present in predicted texture map 114. In some embodiments, predicted texture map 114 is applied to object 102 in an augmented reality environment. For example, an augmented reality headset may detect object 102 and transpose predicted texture map 114 over object 102 in the appropriate location and display the wrapped object 102 to the user in augmented reality.

Figure 4:
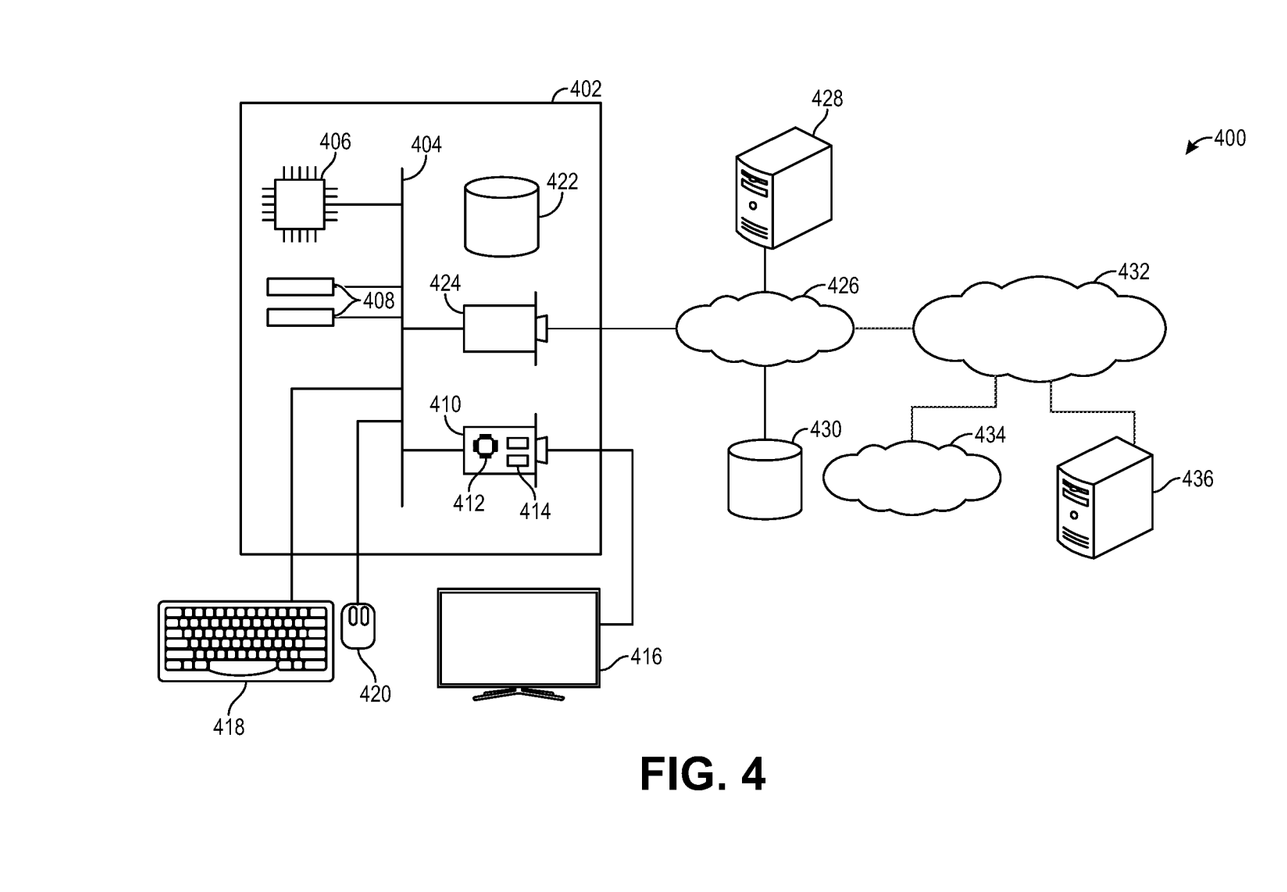
FIG. 4 depicts an exemplary hardware platform for certain embodiments.

FIG. 4 illustrates an exemplary hardware platform for certain embodiments of the invention. Computer 402 can be a desktop computer, a laptop computer, a server computer, a mobile device such as a smartphone or tablet, or any other form factor of general- or special-purpose computing device. Depicted with computer 402 are several components, for illustrative purposes. In some embodiments, certain components may be arranged differently or absent. Additional components may also be present. Included in computer 402 is system bus 404, whereby other components of computer 402 can communicate with each other. In certain embodiments, there may be multiple buses or components that may communicate with each other directly. Connected to system bus 404 is central processing unit (CPU) 406. Also attached to system bus 404 are one or more random-access memory (RAM) modules 408. Also attached to system bus 404 is graphics card 410. In some embodiments, graphics card 410 may not be a physically separate card, but rather may be integrated into the motherboard or the CPU 406. In some embodiments, graphics card 410 has a separate graphics-processing unit (GPU) 412, which can be used for graphics processing or for general purpose computing (GPGPU). Also on graphics card 410 is GPU memory 414. Connected (directly or indirectly) to graphics card 410 is display 416 for user interaction. In some embodiments no display is present, while in others it is integrated into computer 402. Similarly, peripherals such as keyboard 418 and mouse 420 are connected to system bus 404. Like display 416, these peripherals may be integrated into computer 402 or absent. Also connected to system bus 404 is local storage 422, which may be any form of computer-readable media, and may be internally installed in computer 402 or externally and removably attached.

Computer-readable media include both volatile and non-volatile media, removable and non-removable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 424 is also attached to system bus 404 and allows computer 402 to communicate over a network such as network 426. NIC 424 can be any form of network interface known in the art, such as Ethernet, ATM, fiber, Bluetooth, or Wi-Fi (i.e., the IEEE 802.11 family of standards). NIC 424 connects computer 402 to local network 426, which may also include one or more other computers, such as computer 428, and network storage, such as data store 430. Generally, a data store such as data store 430 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 428, accessible on a local network such as local network 426, or remotely accessible over Internet 432. Local network 426 is in turn connected to Internet 432, which connects many networks such as local network 426, remote network 434 or directly attached computers such as computer 436. In some embodiments, computer 402 can itself be directly connected to Internet 432.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. One or more non-transitory computer-readable media storing computer-executable instructions that, when executed by a processor, perform a method of approximating a finite element analysis texture map for an object, the method comprising the steps of:
   receiving a three-dimensional virtual model of the object;
   running a plurality of finite element analysis simulations on the three-dimensional virtual model, wherein each finite element analysis simulation comprises generating a simulated strain mapping based on one or more simulated inputs;
   generating a simulated texture map for each simulated strain mapping;
   training a supervised learning model to generate a predicted texture map, wherein the supervised learning model is trained on the one or more simulated inputs and simulated texture maps;
   receiving one or more user inputs corresponding to the object;

generating the predicted texture map for the object based on the one or more user inputs using the supervised learning model; and displaying the predicted texture map as applied to the object.

2. The computer-readable media of claim 1, wherein the one or more user inputs corresponding to the object are generated by measuring forces applied to the object.

3. The computer-readable media of claim 1, wherein a numeric indication of the one or more user inputs is also displayed.

4. The computer-readable media of claim 1, wherein the predicted texture map as applied to the object is displayed on a head mounted display.

5. The computer-readable media of claim 1, wherein the predicted texture map as applied to the object is displayed in augmented reality.

6. The computer-readable media of claim 1, wherein the three-dimensional virtual model of the object includes information about at least one material of the object.

7. The computer-readable media of claim 1, wherein the predicted texture map comprises a colored indication of internal strains in the object.

8. A system for approximating a finite element analysis texture map for an object, comprising:
a server programmed to:
run a plurality of finite element analysis simulations on a three-dimensional computer model of the object, wherein each finite element analysis simulation comprises generating a simulated strain mapping based on one or more simulated inputs;
convert each simulated strain mapping to a simulated texture map; and
train a supervised learning model to generate a predicted texture map that approximates the finite element analysis simulation based on one or more user inputs, wherein the supervised learning model is trained on the one or more simulated inputs and simulated texture maps;
at least one sensor programmed to measure the one or more user inputs related to the object; and
a head mounted display programmed to:
receive the predicted texture map based on the supervised learning model; and
apply the predicted texture map to the object.

9. The system of claim 8, wherein the at least one sensor is attached to a glove and measures a force applied by the glove to the object and a position of the sensor.

10. The system of claim 9, wherein the at least one sensor comprises a first sensor attached to a first finger portion of the glove and a second sensor attached to a second finger portion of the glove.

11. The system of claim 8, wherein the head mounted display comprises a camera, and wherein the predicted texture map is applied to the object and displayed in an augmented reality environment.

12. The system of claim 8, wherein the head mounted display comprises a virtual reality headset, the object is a virtual object, and the predicted texture map is applied to the object and displayed in a virtual reality environment.

13. The system of claim 12, wherein the at least one sensor is attached to a glove to provide haptic feedback to a user.

14. The system of claim 13, wherein the haptic feedback is configured to restrict a movement of one or more fingers of the user in connection with the user interacting with the object in virtual reality.

15. A method of approximating a finite element analysis texture map for an object, the method comprising:
receiving a three-dimensional virtual model of the object;
running a plurality of finite element analysis simulations on the three-dimensional virtual model, wherein each finite element analysis simulation comprises generating a simulated strain mapping based on one or more simulated inputs;
generating a simulated texture map for each simulated strain mapping;
training a supervised learning model to generate a predicted texture map, wherein the supervised learning model is trained on the one or more simulated inputs and simulated texture maps;
receiving one or more user inputs corresponding to the object;
generating the predicted texture map for the object based on the one or more user inputs using the supervised learning model; and
displaying the predicted texture map as applied to the object.

16. The method of claim 15, further comprising:
measuring forces applied to the object to generate the one or more user inputs corresponding to the object.

17. The method of claim 15, further comprising:
displaying a numeric indication of the one or more user inputs.

18. The method of claim 15, further comprising:
displaying the predicted texture map as applied to the object on a head mounted display.

19. The method of claim 15, further comprising:
displaying the predicted texture map as applied to the object in augmented reality.

20. The method of claim 15, wherein the three-dimensional virtual model of the object includes information about at least one material of the object.

* * * * *